United States Patent [19]

Konno et al.

[11] Patent Number: 4,888,193

[45] Date of Patent: Dec. 19, 1989

[54] BAKERY PRODUCTS AND NOODLES CONTAINING POLYGLUTAMIC ACID

[75] Inventors: Akira Konno, Osaka; Tetsuya Taguchi, Kakogawa; Takenobu Yamaguchi, Akashi, all of Japan

[73] Assignee: Takeda Chemical Industries, Ltd., Osaka, Japan

[21] Appl. No.: 172,193

[22] Filed: Mar. 23, 1988

[30] Foreign Application Priority Data

Mar. 24, 1987 [JP] Japan .................................. 62-69805
Aug. 11, 1987 [JP] Japan ................................. 62-201511

[51] Int. Cl.$^4$ ........................ A21D 2/00; A21D 13/00
[52] U.S. Cl. .................................... 426/549; 426/557; 426/653; 426/451
[58] Field of Search ............... 426/549, 556, 557, 451, 426/321, 531, 532, 335, 653

[56] References Cited

U.S. PATENT DOCUMENTS 4,226,264 10/1980 Bridgeford .......................... 426/138

FOREIGN PATENT DOCUMENTS 209635 11/1984 Japan .

OTHER PUBLICATIONS

FSTA, 75-09-P1938, Type 17/4/13, Journal No. 75048744.
FSTA, 75-10-P1633, Type 17/4/15, Journal No. 72053333.
Journal of the Agricultural Chemical Society of Japan, vol. 37, No. 7, pp. 407-411, (1963).
Journal of the Agricultural Chemical Society of Japan, vol. 37, No. 6, pp. 346-350, (1963).
Murahashi et al., Ed., "Synthetic High Polymers", v. 5, pp. 16-17 and 45-46, Asakura Shoten, (1971).
Yamaguchi, Momos et al., Ed., *A Cultural Dictionary of Japan*, Japan times, Ltd.
R. Collison, "Starch and its Derivatives", J. A. Radley, Ed., Chapman and Hall Ltd., pp. 168 and 194, (1968).
S. Hizukuri, "Shokuhin Kogyo", (Food Industry), 1-ii, p-89 and 2-ii, p-83, (1969).
Kenzo Okada, "Shokuhin-to-Kagaku", (Food and Science), Supplement Issue, (1986), p. 21.
Nobuhide Hagiwara, "Shokuhin-to-Kagaku", (Food and Science), Supplemental Issue, (1981), p. 96.

*Primary Examiner*—Marianne Cintins
*Attorney, Agent, or Firm*—Wegner & Bretschneider

[57] ABSTRACT

By addition of polyglutamic acid or an edible salt thereof, in the case of breads and cakes, the baked volume is increased, an elastic and delicate grain of crumb is assured and a moist texture is provided, in the case of cookies and biscuits, a minimum of dimensional change on baking and a less stodgy texture are assured, in the case of noodles, the body and firm texture are increased and the dissolution of solid matters into boiling water is decreased.

16 Claims, No Drawings

BAKERY PRODUCTS AND NOODLES CONTAINING POLYGLUTAMIC ACID

The present invention relates to bakery products, noodles and a shape-retaining composition, each containing polyglutamic acid or an edible salt thereof.

Usual starch foods such as raw Western cakes, bread and the like become hard with time after production that suffer degradations in texture. The hardening process proceeds fast when such food is stored at low temperature so that its useful life in terms of texture is seriously shortened. This is known as the aging phenomenon characteristic of starch food and it has been generally attempted to prevent this aging of starch food by adding surfactants, sugars, starch decomposing enzymes, etc. or by increasing the amount of water added. [R. Collison: Starch and its Derivatives, J. A. Radley ed.), 4th ed., Chapman and Hall, p.168, 194 (1968) and S. Hizukuri: Shokuhin Kogyo (Food Industries), 1-ii, p.89 and 2-ii, p.83 (1969)]

Among various starch foods, noodles such as Chinese noodles, spaghetti, macaroni, "soba" (buckwheat noodles), "udon" (wheat noodles), etc. feature a bodied biting quality and texture, as an inherent characteristic of noodles and an important element of their deliciousness. To impart this bodied biting quality to noodles, it has been attempted to control the proportion of wheat flour or add texture-improving agents such as polyphosphates, carboxymethylcellulose and so on. [Kenzo Okada: Shokuhin-to-Kagaku (Food and Science), Supplemental Issue (1986), p.21 and Nobuhide Hagiwara Shokuhin-to-Kagaku, Supplemental Issue (1981), p.96]

Furthermore, in order to provide such food with a shape-retaining property, various surfactants such as lecithin, sucrose fatty acid esters, etc. or gluten have heretofore been utilized.

However, the addition of such an aging inhibitor may detract from the texture of food or, depending on the case, may not produce sufficient anti-aging effects. The method of increasing the amount of water added is confronted by the inherent limit to water absorption of cereal flour and if water is added in excess of that limit, the dough will be too soft in consistency and in extreme cases the water will separate out to make molding and other operations difficult and even interfere with shape retentivity and, hence, the marketability of products.

Furthermore, although the addition of a texture-improving agent or a shape-retaining agent may have the expected effect in some cases, it has been found that the results are not fully satisfactory.

Under the above circumstances, the present inventors explored the problems and discovered that the addition of polyglutamic acid or an edible salt thereof in the manufacture of starch food results in the prevention of aging and the improvement of texture and further contributes to the shape retention of food.

Thus, the present invention relates to
(1) bakery products containing polyglutamic acid or an edible salt thereof
(2) noodles containing polyglutamic acid or an edible salt thereof, and
(3) a shape-retaining composition containing polyglutamic acid or an edible salt thereof.

The bakery Products according to the present invention contain wheat flour as a predominant component and include breads such as bread, white bread, roll, white roll, bun and white bun, etc., cakes such as sponge cake, paõ de Castella, doughnut, pound cake, etc., cookie, biscuit and so on.

The noodles according to the present invention also contain wheat flour as a predominant component and include "udon" (wheat noodles), soba noodles, Chinese noodles, macaroni, spaghetti and so on.

The polyglutamic acid to be employed in the present invention may be any polyglutamic acid ($\gamma$-polyglutamic acid) extracted from "natto", i.e. fermented soybeans, synthetic polyglutamic acid ($\alpha$-polyglutamic acid) derived from a polymer of glutamic ester-N-carboxylic anhydride, and polyglutamic acid ($\gamma$-polyglutamic acid) obtainable as fermentation products of various microorganisms, and methods for production of these polyglutamic acids are described, for example, in Journal of the Agricultural Chemical Society of Japan 37, No. 7, 407–411, 1963, Journal of the Agricultural Chemical Society of Japan 37, No. 6, 346–350, 1963, and Murahashi S., Imoto M., and Tani H. (ed.): Synthetic High Polymers, Vol. 5, 16–17 and 45–46, Asakura Shoten, 1971, respectively.

Among the above-mentioned polyglutamic acids, the $\gamma$-polyglutamic acid obtainable as fermentation product is preferably used.

The edible salt may for example be the sodium, potassium or calcium salt of polyglutamic acid and is preferably the sodium salt.

The molecular weight of the polyglutamic acid to be added in accordance with the invention may generally be in excess of about 10,000 as sodium salt and preferably be in the range of about 150,000 to 2,000,000. The most desirable molecular weight range is about 200,000 to 500,000.

The bakery products or noodles according to the present invention can be manufactured by incorporating polyglutamic acid or an edible salt thereof in the food material. The method for incorporation is optional; for example, the acid or salt may be previously added to the raw wheat flour or be added in the course of cooking. All that is necessary is that polyglutamic acid or an edible salt thereof homogeneously coexists with raw wheat flour when the latter is kneaded with water.

The proper level of addition of polyglutamic acid or an edible salt thereof in the manufacture of said foods is as follows.

For the manufacture of noodles, about 0.1 to 2% (w/w), preferably about 0.5 to 1.5% (w/w), of polyglutamic acid or an edible salt thereof is added to wheat flour. This addition improves the body and texture of noodles and reduces the amount of dissolution into boiling water to assure a higher yield.

For the manufacture of bread, polyglutamic acid or an edible salt thereof is added in a proportion of about 0.03 to 0.5% (w/w), preferably about 0.05 to 0.3% (w/w), relative to wheat flour. This addition increases the baked volume of bread, assures a more delicate grain of crumb and provides a moist texture.

For the manufacture of cookie or biscuit, polyglutamic acid or an edible salt thereof may be added in a proportion of about 0.1 to 2.0% (w/w), preferably about 0.1 to 1.0% (w/w), relative to wheat flour. This addition contributes to an improved baked shape retention and a less stodgy texture.

For the production of cakes, the addition of polyglutamic acid or an edible salt in a proportion of about 0.03 to 0.5% (w/w), preferably about 0.05 to 0.3%

(w/w), relative to wheat flour results in an increased finished volume and a moist texture.

The shape-retaining composition according to the present invention may be polyglutamic acid or an edible salt thereof as such or may be provided as a mixture of polyglutamic acid or an edible salt thereof and other components which are commonly incorporated in bakery Products or noodles in suitable proportions. More particularly, sucrose, etc. may be incorporated in the shape-retaining composition for bread, and sodium chloride, polyphosphoric acid, surfactants, etc. may be incorporated in the shape-retaining composition for noodles.

The level of addition of such shape-retaining agent to said food is determined so that the above-mentioned concentration is ultimately established in the food. When this shape-retaining agent is added to bread, for instance, the three-dimensional structure of the dough at ripening is better retained so that the finished bread retains the desire shape and has a good bulk. In the case of noodles, the flour fraction will not be dissolved out into boiling water and the finished noodles will have a uniform configuration and a firm body.

The following experimental, working and reference examples are intended to illustrate the present invention in further detail and should by no means be construed as defining the scope of the invention.

In the following examples, all percents (%) are weight percentages (w/w %) unless otherwise indicated.

EXPERIMENTAL EXAMPLE 1

To 500 g portions of medium-strength wheat flour were respectively added 0 to 20 g of sodium polyglutamate (molecular weight: about 200,000 to 300,000) and after mixing, a solution of 16 g sodium chloride in 160 g of water was added. The mixture was kneaded in a mixer (120 r.p.m.) for 7 minutes. After 20 minutes' ripening, the dough was rolled twice to give a dough slab with a thickness of 3 mm. Using a cutter roll [TIPO LUSSO sp 150 (Imperia, Italy)], the above slab was cut to give noodles measuring about 30 cm long. The noodles were boiled in hot water for 14 minutes, after which they were raised, washed and drained to give boiled noodles.

Table 1 shows sensory evaluation data on the noodles.

TABLE 1

| Level of addition of sodium polyglutamate (% relative to wheat flour) | Stretchability of raw noodles | Body of boiled noodles |
|---|---|---|
| Not added | Poor | Poor |
| 0.2 | Slightly poor | Fairly good |

TABLE 1-continued

| Level of addition of sodium polyglutamate (% relative to wheat flour) | Stretchability of raw noodles | Body of boiled noodles |
|---|---|---|
| 0.5 | Good | Fairly good |
| 1.0 | Good | Good |
| 2.0 | Fairly great | Fairly good |
| 4.0 | Great | Fairly good |

It will be apparent from the above results that satisfactory noodles are obtained when sodium polyglutamate is added in an amount of 0.5 to 2.0% relative to wheat flour.

EXPERIMENTAL EXAMPLE 2

To 500 g of medium-strength wheat flour was added 5 g of sodium polyglutamate (molecular weight: about 200,000–300,000) followed by addition of a solution of 16 g sodium chloride in 160 g water. The mixture was kneaded in a mixer (120 r.p.m.) for 7 minutes. After 20 minutes' ripening, the dough was rolled twice to give a slab with a thickness of 3 mm. Using a cutter roll [TIPO LUSSO sp 150, (Imperia, Italy)], the above slab was cut to give noodles measuring about 30 cm. About 85 g of the noodles were boiled in water for 14 minutes, after which they were raised, washed with water and drained to give boiled noodles.

The above production procedure was repeated except that sodium polyglutamate was replaced with egg white powder, sodium caseinate or carboxymethylcellulose to give boiled noodles. Control boiled noodles composed exclusively of wheat flour and sodium chloride solution, without additives, were also prepared.

The appearances of residual boiling water and the sensory evaluation data for these boiled noodles are shown in Table 2.

TABLE 2

| Additive | Appearance of residual boiling water | Body of boiled noodles (water content 72%) |
|---|---|---|
| No additive | Very cloudy | Weak |
| Sodium polyglutamate | Slightly cloudy | Good |
| Egg white powder | Slightly cloudy | Slightly hard |
| Sodium caseinate | Very cloudy | Slightly weak |
| Carboxymethylcellulose | Fairly cloudy | Slightly weak |

It will be apparent from the above results that the boiled noodles prepared with the addition of sodium polyglutamate had the highest quality.

EXPERIMENTAL EXAMPLE 3

Bread samples were prepared by the routine spongedough method using the dough compositions and process conditions indicated below in Table 3.

TABLE 3

|  |  | Sponge stage | Dough stage control | A | B | C | D | E |
|---|---|---|---|---|---|---|---|---|
| Formulation (Parts by weight) | High-strength wheat flour | 70 | 30 | 30 | 30 | 30 | 30 | 30 |
|  | Live yeast | 2 | — | — | — | — | — | — |
|  | Sucrose | 0.1 | 5 | 5 | 5 | 5 | 5 | 5 |
|  | Sodium chloride | — | 2 | 2 | 2 | 2 | 2 | 2 |
|  | Skim milk powder | — | 3 | 3 | 3 | 3 | 3 | 3 |
|  | Shortening | — | 5 | 5 | 5 | 5 | 5 | 5 |
|  | Water | 40 | 20 | 20 | 20 | 20 | 20 | 20 |
|  | Sodium polyglutamate (mol.wt.about200,000– | — | — | 0.05 | 0.1 | 0.2 | 0.5 | 1.0 |

TABLE 3-continued 300,000)

| | | Process conditions | |
|---|---|---|---|
| | Mixing (min.) | Low speed, 2 min.; high speed, 2 min. | Low speed, 3 min.; low speed, 2 min.; high speed, 3 min. |
| | Temperature (° C.) | 24 | 28 |
| | Fermentation time (min.) | 180 | 15 |
| | Bench time (min.) | — | 20 |
| | Proof time (min.) | — | 50 |
| | Bake time (200° C.) (min.) | — | 30 |

TABLE 4

| | Control | A | B | C | D | E |
|---|---|---|---|---|---|---|
| Specific volume | Δ | ○ | ◎ | Δ | x | x |
| Grain of crumb | Δ | ○ | ○ | Δ | Δ | x |
| Texture | Δ | ○ | ◎ | Δ | x | x |

(◎ excellent, ○ superior, Δ ordinary, x inferior)

The results are shown in Table 4. Compared with the control bread, the bread samples prepared with addition of 0.05 to 0.1%, relative to wheat flour, of sodium polyglutamate were superior in all terms of specific volume, grain of crumb and texture.

EXPERIMENTAL EXAMPLE 4

Bread samples were prepared by the routine spongedough method using the dough compositions and process conditions indicated below in Table 5.

TABLE 5

| | | Sponge stage | | | | | | Dough stage |
|---|---|---|---|---|---|---|---|---|
| | | control | A | B | C | D | E | |
| Formulation (Parts by weight) | High-strength wheat flour | 70 | 70 | 70 | 70 | 70 | 70 | 30 |
| | Live yeast | 2 | 2 | 2 | 2 | 2 | 2 | — |
| | Yeast food* | 0.1 | 0.1 | 0.1 | 0.1 | 0.1 | 0.1 | — |
| | Sodium chloride | — | — | — | — | — | — | 2 |
| | Sugar | — | — | — | — | — | — | 5 |
| | Skim milk | — | — | — | — | — | — | 3 |
| | Shortening | — | — | — | — | — | — | 5 |
| | Water | 40 | 40 | 40 | 40 | 40 | 40 | 25 |
| | Sodium polyglutamate (mol. wt. about 200,000–300,000) | — | 0.1 | 0.2 | 0.3 | 0.5 | 1.0 | — |

| | | Process conditions | |
|---|---|---|---|
| | Mixing | Low speed, 2 min.; high speed, 2 min. | Low speed, 3 min.; low speed, 2 min.; high speed, 3 min. |
| | Temperature (°C.) | 24 | 28 |
| | Fermentation time (min.) | 240 | 20 |
| | Bench time (min.) | — | 20 |
| | Proof time (min.) | — | 50 |
| | Bake time (200° C.) (min.) | — | 25 |

*C-Oriental Food (Oriental Yeast Co., Ltd.)

TABLE 6

| | Control | A | B | C | D | E |
|---|---|---|---|---|---|---|
| Specific volume | Δ | ○ | ◎ | ○ | Δ | x |
| Grain of crumb | Δ | ○ | ○ | ○ | Δ | x |
| Texture | Δ | ○ | ◎ | ○ | | x |

(◎ Excellent, ○ superior, Δ ordinary, x inferior)

The results are shown in Table 6. Compared with the control bread, the bread samples prepared with addition of 0.1 to 0.3%, relative to wheat flour, of sodium glutamate were superior in all terms of specific volume, grain of crumb and texture.

EXPERIMENTAL EXAMPLE 5

One-hundred grams of whole egg was taken in a bowl and whipped for 6 minutes using hand mixer. Then, 100 g of sugar was added and the mixture was further whipped for 2 minutes. Thereafter, 33 g of water and a varying amount of sodium polyglutamate as shown below were added and the mixture was further whipped for 2 minutes. Then, 100 g of low-strength wheat flour and a small amount of vanilla essence were added and the mixture was promptly stirred, poured into a stainless steel container, 16 cm in diameter and 6 cm in height, and baked in an oven at 180° C. for 40 minutes to give a sponge cake. Table 7 shows the specific volumes of sponge cakes obtained with a varying proportion of sodium polyglutamate in the above manner and the texture of each cake in comparison with the control cake. When the proportion of sodium polyglutamate was 0.02 to 0.5 g based on 100 g of wheat flour, the sponge cake had a large specific volume and offered a satisfactory texture.

TABLE 7

| Amount of sodium polyglutamate (g) | Specific volume (ml/g) | Texture |
|---|---|---|
| 0 (control) | 3.2 | — |
| 0.02 | 3.3 | Slightly moist |
| 0.05 | 3.4 | Fluffy and moist |
| 0.10 | 3.4 | Fluffy and moist |
| 0.20 | 3.5 | Slightly fluffy and moist |
| 0.30 | 3.3 | Slightly hard and moist |
| 0.50 | 3.2 | Slightly hard but moist |
| 1.00 | 2.8 | Hard |

EXAMPLE 2

Using 500 g of medium-strength heat flour, 16 g of sodium chloride, 175 g of water and 5 g of polyglutamic acid (molecular weight: about 200,000–300,000), boiled "udon" noodles were prepared by the routine procedure. The noodles had a firm texture. On the other hand, boiled "udon" noodles prepared without addition of polyglutamic acid under otherwise the same conditions had a comparatively weak body.

Moreover, when these boiled "udon" noodles were immersed in boiling water for 3 minutes, the noodles made with addition of polyglutamic acid gave a residual water with slight cloudiness, while the noodles obtained without polyglutamic acid gave a residual water which was more cloudy.

EXAMPLE 2

Raw "soba" noodles were prepared by the routine production method using 600 g of medium-strength wheat flour, 400 g of "soba" powder, 300 g of water, and 12 g of sodium polyglutamate (molecular weight: about 200,000–300,000). Raw "soba" noodles were also prepared using the same recipe except that sodium polyglutamate was omitted. When these "soba" noodles were immersed in boiling water for 4 minutes, the noodles obtained without addition of sodium polyglutamate were found to have poor chewability and gave a very cloudy residual water, while the noodles obtained with the addition of sodium polyglutamate had good chewability and gave a less cloudy residual water.

EXAMPLE 3

Chinese noodles were prepared by the routine production method using 500 g of medium-strength wheat four, 1.5 g of soda water, 10 g of sodium chloride, 150 g of water, and 7.5 g of sodium polyglutamate (molecular weight: about 200,000–300,000). Control Chinese noodles were also prepared using the above recipe from which sodium polyglutamate was omitted. Compared with the Chinese noodles prepared without addition of sodium polyglutamate, the noodles obtained with the addition of sodium polyglutamate were more elastic and satisfactory.

When these Chinese noodles were boiled in hot water for 3 minutes, the residual water after withdrawal of the noodles obtained with addition of sodium polyglutamate was not very cloudy but that after raising of the noodles prepared without sodium polyglutamate was markedly cloudy.

EXAMPLE 4

In a mixer bowl, 500 g of high-strength wheat flour, 50 g of sucrose, 5 g of sodium chloride, 8 g of dry yeast, 15 g of skim milk, 50 g of egg, 2.5 g of sodium polyglutamate (molecular weight: about 200,000–300,000), and 275 g of water were mixed together. After kneading, 50 g of butter was added, followed by further keading to prepare a dough. This dough was taken in a bowl, covered with a moisture-proof film, and left standing in a incubator at about 30° C. for 40 minutes. Then, aeration, scaling, rounding and molding were performed in routine manner to give a roll bread dough. This dough was allowed to ferment at 38° C. and 85% R.H. for 40 minutes, after which it was baked in an oven at 200° C. for 12 minutes to give a roll bread.

A control roll bread was prepared using the same recipe except that sodium polyglutamate was omitted. Compared with this control bread, the roll bread manufactured with addition of sodium polyglutamate had a slightly larger volume and soft texture.

EXAMPLE 5

In a bowl, 65 g of sucrose was added to 55 g of well-kneaded butter and the mixture was kneaded thoroughly. To this were added 1 g of sodium chloride, 0.5 g of sodium polyglutamate (molecular weight: about 200,000–300,000) and 60 g of egg in small portions with stirring. Then, a sieved mixture of 100 g low-strength wheat flour and 2 g of baking powder was added and mixed well. The mixture was distributed into molds and baked in an oven at 180° C. for 18 minutes to give cookies.

Compared with cookies manaufactured using the same recipe from which sodium polyglutamate had been omitted, the cookies obtained with addition of sodium polyglutamate featured a lesser change in shape on baking and had a lighter texture.

EXAMPLE 6

A sponge cake was prepared in the per-se conventional manner using 100 g of low-strength wheat flour, 100 g of sucrose, 100 g of egg, 33 g of water, 0.1 g of sodium polyglutamate (molecular weight: about 200,000–300,000) and a small amount of vanilla essence. Using the same recipe from which sodium polyglutamate alone was excluded, a control sponge cake was prepared.

Compared with the control sponge cake, the sponge cake manufactured with addition of sodium polyglutamate had a larger volume and a more moist, fluffy texture.

EXAMPLE 7

Using the mixture of 100 weight parts of semolina derived from Durum wheat flour, 0.5 weight parts of sodium polyglutamate (molecular weights: about 200,000–300,000) and 30 weight parts of water as raw material, the spaghetti (diameter: abut 1.8 mm) of the present invention was prepared by the routine manner using a mixer and press made by Braibanti.

A control spaghetti was prepared using the same recipe except that sodium polyglutamate was omitted.

To about 2l of boiled water in which two teaspoons of sodium chloride was dissolved, 200 g each of spaghetti obtained was added and boiled for about 11 minutes with mixing at intervals, after which each sample was raised and drained to give each spaghetti.

To each spaghetti sample was added canned meat-sauce (Takeda Food Products, Ltd., Japan) which was heated in boiling water for 15 minutes to give two types of spaghetti meat-sauce. Compared with the control, the spaghetti according to the invention gave a supple and elastic texture and was delicious.

REFERENCE EXAMPLE 1

A commercial "natto" (fermented soybeans) was mixed well with 5 volumes of sterile water and the mixture was filtered through a gauze to remove the solid matter. The filtrate was serially diluted with sterile water and 0.1 ml of the dilution was used to inoculate an agar plate (pH 6.4) containing, per liter, 50 g of sucrose, 15 g of L-glutamic acid, 2.7 g of $KH_2PO_4$, 4.2 g of $Na_2HPO_4 19\ 12H_2O$, 0.5 g of $MgSO_4 19\ 7H_2O$, 0.5 g of NaCl, 2 mg of $MnSo_4 19\ 413\ 6H_2O$, 100 pg of biotin and 15 g of agar. The inoculated agar plate was incubated at 37° C. for 3 days. One mucoid colony was picked from among the emergent colonies and subjected to the same procedure using the same medium. The mucopolysaccharide-producing strain thus obtained was used to inoculate a slant L-medium containing Bacto-trypton 1%, yeast extract 0.5%, NaCl 1% and agar 1.5% and cultured at 37° C. overnight. One loopful of the culture was further inoculated into a 200 ml-conical flask containing 20 ml of a medium (pH 6.4) containing, per liter, 50 g of glucose, 15 g of L-glutamic acid, 2.7 g of $KH_2PO_4$, 4.2 g of $Na_2HPO_4 1\ 12H_2O$, 0.5 g of $MgSO_4 19\ 7H_2O$, 0.5 g of NaCl, 2 mg of $MnSO_4 19\ 413\ 6H_2O$ and 100 82 g of biotin and was cultured under stationary conditions at 37° C. for 4 days. The culture broth was centrifuged to remove the cells and the output of polyglutamic acid in the supernatant was determined by the safranine-0 method [Kagaku-no-Ryoiki, Supplemental Issue, P.P. 11014 112, 1962]. The output of polyglutamic acid was found to be 4.5 g/l.

A 2-liter portion of the above culture broth was centrifuged to remove the cells and 4l of 95% ethanol was added to the supernatant, whereupon sodium polyglutamate separated. This precipitate was dissolved in about 1l of water and the solution was lyophilized to give 8 g of sodium polyglutamate.

The molecular weight of the above sodium polyglutamate was determined by gel filtration chromatography on Sephacryl S-500 (Pharmacia Fine Chemicals, Sweden).

Thus, 10 ml of a 1.0 mg/ml aqueous solution of the sodium polyglutamate was poured into a column (2.5 cm in diameter and 125 cm high) and using a 1% (w/v) aqueous solution of sodium chloride as the eluent, gel filtration was performed at the flow rate of 40 ml/hr. The eluate was collected in 5 ml fractions and the amount of sodium polyglutamate was estimated from the absorbance of each fraction at 210 nm. By comparison with the calibration curve constructed with standard samples of known molecular weights, the molecular weight of the sodium polyglutamate was found to be about 200,000 to 300,000.

REFERENCE EXAMPLE 2

To 24 kg of a commercial "natto" was added 3 volumes of water and the mucoid substance was extracted with stirring. The extraction residue soybean was sieved off. The mucoid extract was adjusted to pH 2 with concentrated hydrochloric acid and centrifuged into a sediment and a supernatant. To the supernatant was added a sufficient amount of sodium chloride to give a NaCl concentration of 10% (w/v) to salt out polyglutamic acid. This precipitate was collected by centrifugation, washed thoroughly with water and neutralized and dissolved by addition of aqueous sodium hydroxide. This solution was lyophilized to give 160 g of sodium polyglutamate as powder.

The molecular weight of this sodium polyglutamate as determined by the same method as described in Reference Example 1 was about 200,00 to 300,000.

What is claimed is:

1. Bakery products of the class consisting of bread and cake which comprises polyglutamic acid or an edible salt thereof in a proportion of about 0.03 to 0.5% (w/w) relative to wheat flour, wherein the polyglutamic acid has a molecular weight or about 10,000 or more as a sodium salt.

2. The bakery products of claim 1, wherein the molecular weight of the polyglutamic acid is about 150,000 to 2,000,000.

3. The bakery products of claim 1, wherein the molecular weight of the polyglutamic acid is about 200,000 to 500,000.

4. The bakery products of claim 1, wherein the polyglutamic acid is γ-polyglutamic acid prepared by fermentation.

5. The bakery products of claim 1, wherein the edible salt is sodium polyglutamate.

6. The bakery products of claim 1, wherein the proportion of poluglutamic acid or edible salt thereof is about 0.05 to 0.3% (w/w) relative to wheat flour.

7. Bakery products of the class consisting of cookie and biscuit which comprises polyglutamic acid or an edible salt thereof in a proportion of about 0.1 to 2% (w/w) relative to wheat flour, wherein the polyglutamic acid has a molecular weight of about 10,000 or more as a sodium salt.

8. The bakery products of claim 7, wherein the molecular weight of the polyglutamic acid is about 150,000 to 2,000,000.

9. The bakery products of claim 7, wherein the molecular weight of the polyglutamic acid is about 200,000 to 500,000.

10. The bakery products of claim 7, wherein the polyglutamic acid is γ-polyglutamic acid prepared by fermentation.

11. The bakery products of claim 7, wherein the proportion of polyglutamic acid or edible salt thereof is about 0.1 to 1.0% (w/w) relative to wheat flour.

12. Noodles of the class consisting of Chinese noodles, spaghetti, macaroni, soba noodles, and udon noodles which comprise polyglutamic acid or an edible salt thereof in a proportion of about 0.1 to 2.0% (w/w) relative to wheat flour, wherein the polyglutamic acid has a molecular weight of about 10,000 or more as a sodium salt.

13. The noodles of claim 12, wherein the molecular weight of the polyglutamic acid is about 150,000 to 2,000,000.

14. The noodles of claim 12, wherein the molecular weight of the polyglutamic acid is about 200,000 to 500,000.

15. The noodles of claim 12, wherein the polyglutamic acid is gamma-polyglutamic acid prepared by fermentation.

16. The noodles of claim 12, wherein the proportion of polyglutamic acid or edible salt thereof is 0.5 to 1.5% (w/w) relative to wheat flour.

* * * * *